Sept. 11, 1945.　　　C. W. SINCLAIR　　　2,384,649
WHEEL
Filed Dec. 19, 1941　　　4 Sheets-Sheet 1
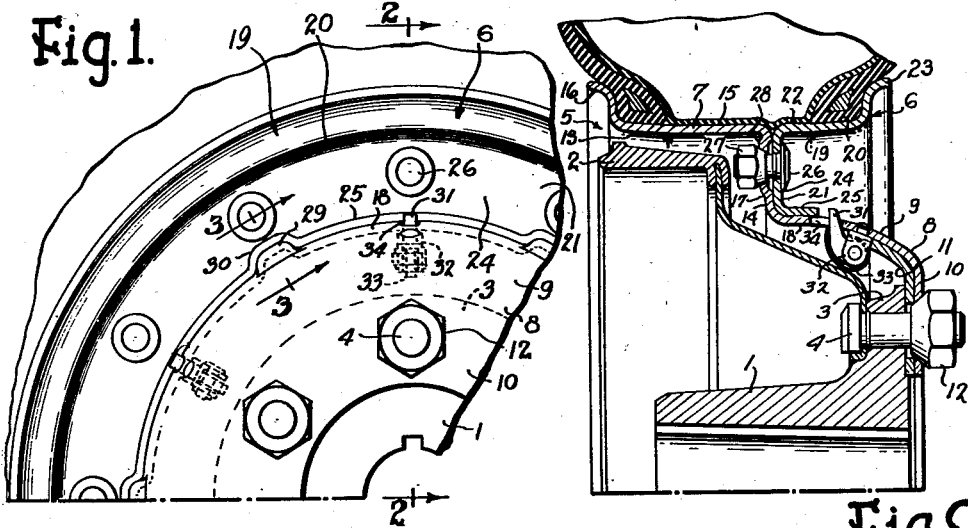
Fig.1.　　Fig.2.
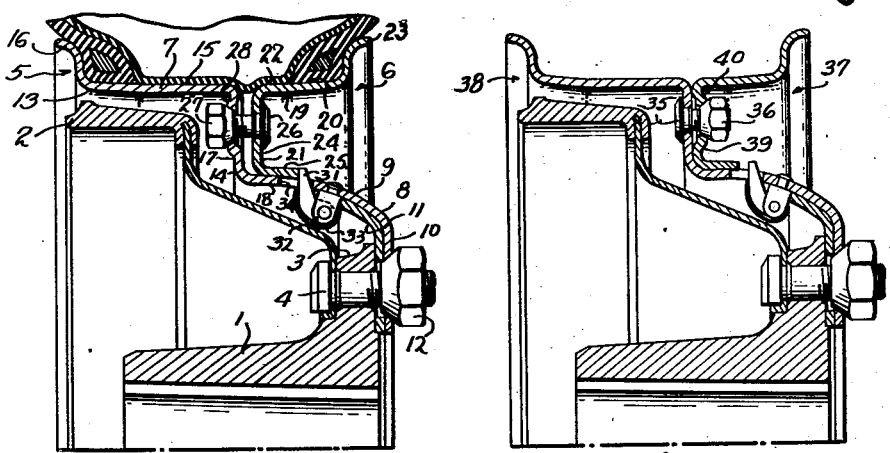
Fig.4.　　Fig.5.
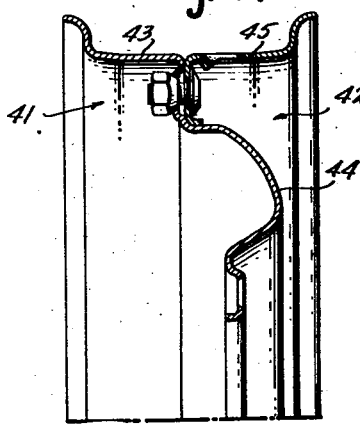
Fig.6.
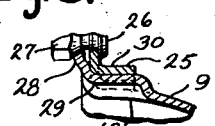
Fig.7.
Fig.3.
INVENTOR.
Charles W. Sinclair
BY
Attorneys Sept. 11, 1945. C. W. SINCLAIR 2,384,649
WHEEL
Filed Dec. 19, 1941 4 Sheets-Sheet 2
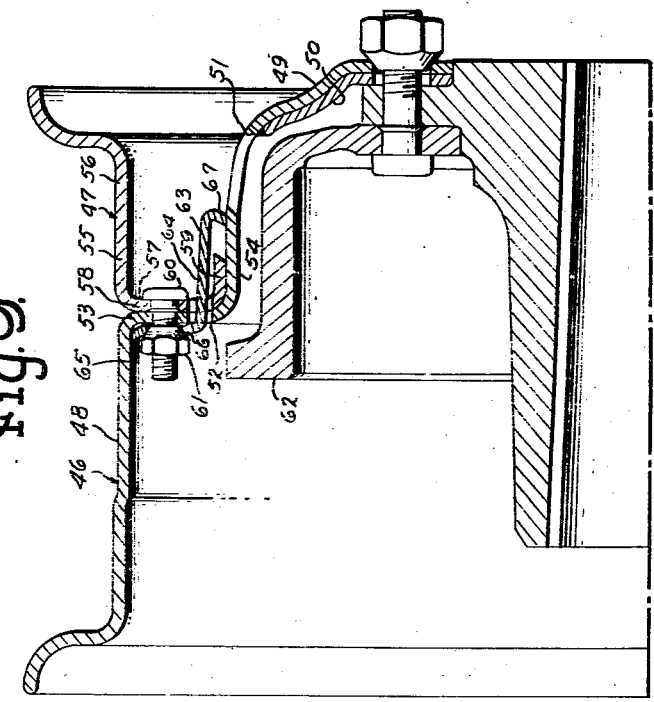
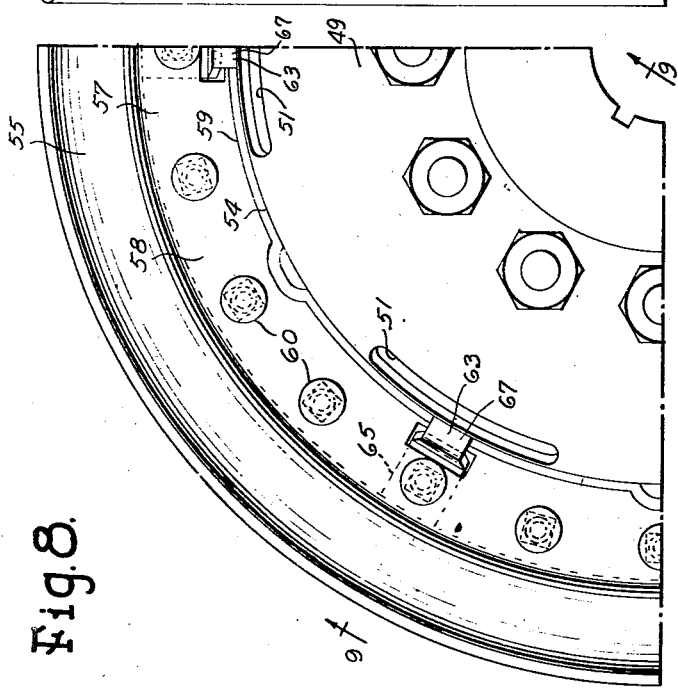
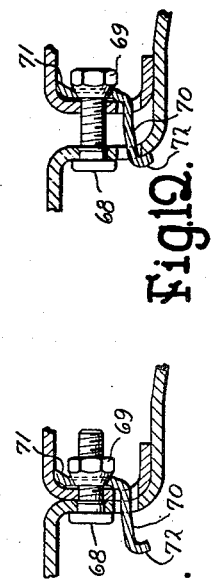
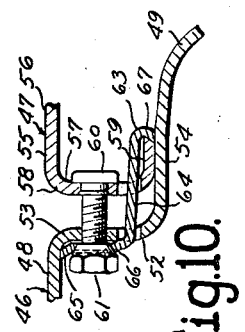
INVENTOR.
Charles W. Sinclair
BY
Attorneys Sept. 11, 1945.   C. W. SINCLAIR   2,384,649
WHEEL
Filed Dec. 19, 1941   4 Sheets-Sheet 3

INVENTOR.
Charles W. Sinclair
BY
Attorneys

Sept. 11, 1945.  C. W. SINCLAIR  2,384,649
WHEEL
Filed Dec. 19, 1941  4 Sheets-Sheet 4

INVENTOR.
Charles W. Sinclair
BY
Attorneys

Patented Sept. 11, 1945

2,384,649

UNITED STATES PATENT OFFICE 2,384,649

WHEEL

Charles W. Sinclair, Detroit, Mich., assignor to Kelsey-Hayes Wheel Company, Detroit, Mich., a corporation of Delaware Application December 19, 1941, Serial No. 423,637

5 Claims. (Cl. 301—63)

The invention relates to wheels and refers more particularly to wheels having divided tire carrying rims.

The invention has for some of its objects to provide a wheel made up of elements or sections which may be readily formed and to provide a wheel which may be mounted in dual with a like wheel.

The invention has for another of its objects to provide a wheel in which the annular rim portions of the rim are radially supported with respect to each other and also driven one with the other separately from the means for securing the rim portions together so that the securing means is relieved from both radial and driving stresses.

The invention has for further objects to provide safety catch means to prevent accidental disengagement of the rim portions from each other when their securing means is released.

With these as well as other objects in view, the invention resides in the novel features of construction and combinations and arrangement of parts as more fully hereinafter set forth.

In the drawings:

Figure 1 is an outboard elevation of a wheel embodying the invention;

Figures 2 and 3 are cross sections on the lines 2—2 and 3—3, respectively, of Figure 1;

Figure 4 is a view similar to Figure 2;

Figure 5 is a view similar to Figure 2 showing another embodiment of the invention;

Figures 6 and 7 are views similar to Figures 2 and 3, respectively, showing another embodiment of the invention;

Figure 8 is a view similar to Figure 1 showing another embodiment of the invention;

Figure 9 is a cross section on the line 9—9 of Figure 8;

Figure 10 is a view similar to Figure 9;

Figure 11 is a view similar to Figure 9 showing another embodiment of the invention;

Figure 12 is a view similar to Figure 11;

Figure 13:
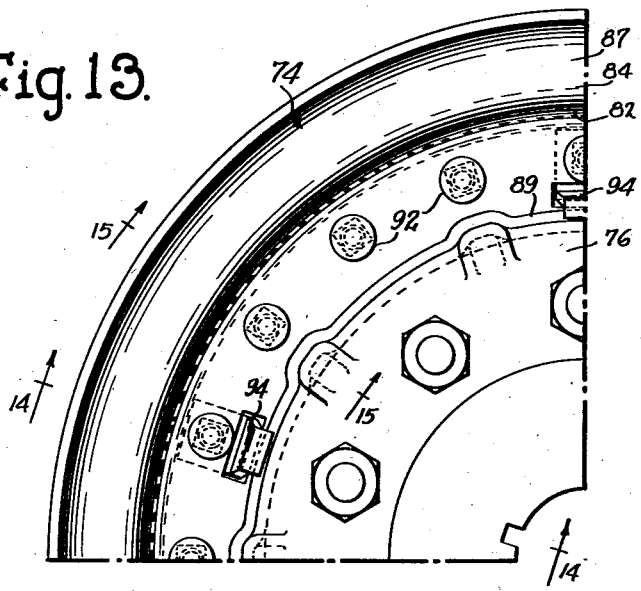
Figure 13 is a view similar to Figure 1 showing another embodiment of the invention.
Figures 14, 16:
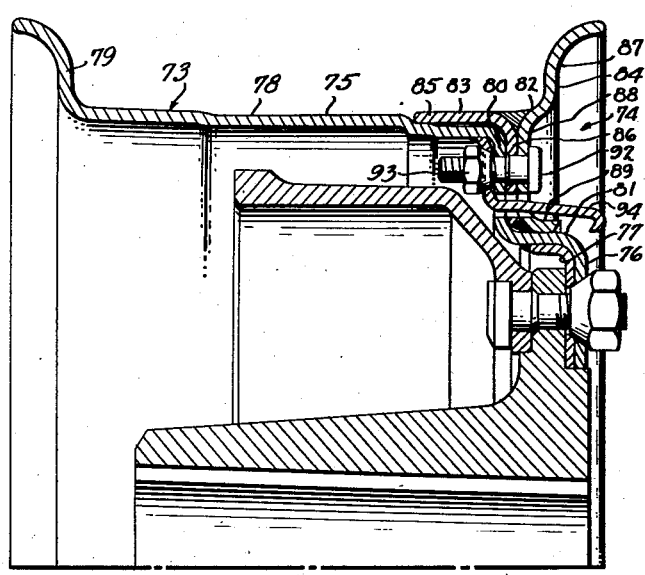
Figure 15:
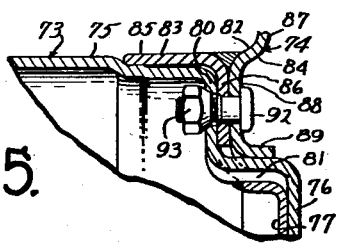
Figure 17:
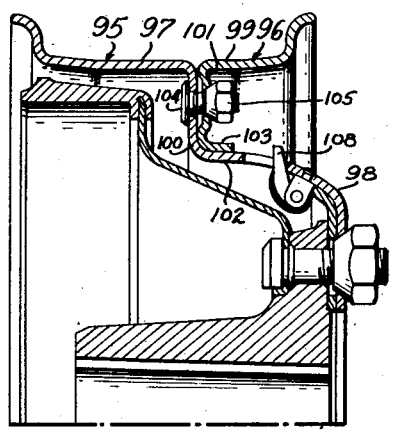
Figure 18:
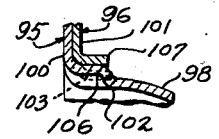
Figure 19:
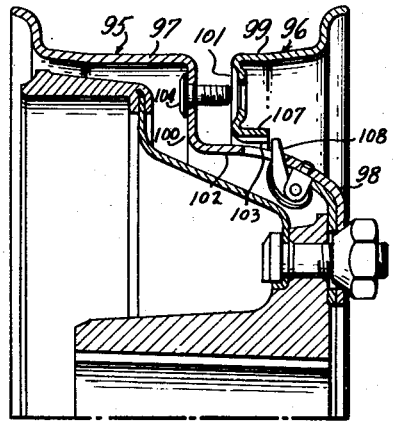
Figure 20:
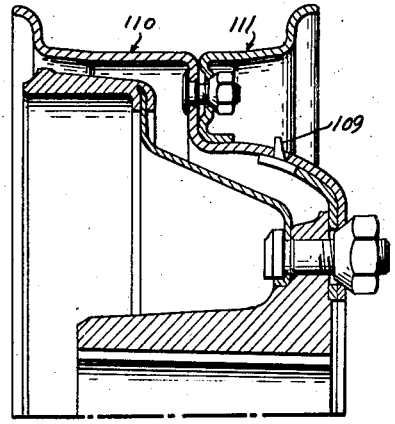

Figures 14 and 15 are cross sections on the lines 14—14 and 15—15, respectively, of Figure 13;

Figure 16 is a view similar to Figure 14;

Figures 17, 18 and 19 are views similar to Figures 2, 3 and 4, respectively, showing another embodiment of the invention;

Figure 20 is a view similar to Figure 17 showing another embodiment of the invention.

In general, the invention relates to wheels for motor vehicles of the commercial, pleasure, and combat types.

Referring to Figures 1, 2, 3 and 4, 1 is the hub of the wheel and 2 the brake drum fixedly secured to the fixed flange 3 of the hub by the annular series of bolts 4. The wheel comprises the inboard and outboard elements or sections 5 and 6, respectively, which are so constructed that they may be formed of sheet metal.

The inboard element or section 5 comprises the integral annular rim portion 7 and wheel body portion 8, the latter having the generally axially extending part 9 and the generally radially extending bolting-on part 10 which are reinforced by the sheet metal part 11 fixedly secured thereto as by welding. The bolting-on part 10 and the part 11 are provided with an annular series of holes for receiving the bolts 4 on which are threaded the nuts 12 for detachably securing the wheel to the wheel hub.

The rim portion 7 has the annular tire engaging portion 13 and the annular attachment portion 14. The tire engaging portion comprises the base 15 integrally connected at its outboard edge to the attachment portion and the integral tire retaining flange 16 at the inboard edge of the base. The attachment portion is formed of the generally radially extending portion 17 and the annular portion 18 at the radially inner edge of the former and extending generally axially in an outboard direction and integrally conecting into the part 9 of the wheel body portion.

The outboard element or section 6 comprises the annular rim portion 19 cooperating with the rim portion 7 to form a rim for carrying a pneumatic tire. The rim portion 19 has the annular tire engaging portion 20 and the annular attachment portion 21. The tire engaging portion comprises the base 22 integrally connected at its inboard edge to the attachment portion and the integral tire retaining flange 23 at the outboard edge of the base. The attachment portion is formed of the generally radially extending portion 24 and the annular portion 25 at the radially inner edge of the former and extending generally axially in an outboard direction.

The inboard and outboard elements or sections are detachably secured to each other by the annular series of bolts 26 and nuts 27 threaded on the bolts. The shanks of the bolts extend through the generally radially extending portions 17 and 24 and preferably have polygonal portions engaging corresponding holes in the portion 24 and permanently secured thereto. The nuts 27 have frusto-conical noses engaging corresponding seats in the bosses 28 pressed in an inboard direction from the portion 17. The length of the bolts is such as to clear the brake drum 2.

The annular portions 18 and 25 of the rim portions are concentric and in engagement so that the bolts 26 are relieved from radial load or stress. Furthermore, these annular portions are splined to each other to relieve the bolts of driving stress. In detail, the annular portions 18 and 25 are formed with the circumferentially spaced axially extending bosses 29 and 30, respectively, which are pressed radially outwardly. The bosses 30 have a sliding fit on the bosses 29 which is sufficiently close to effect the driving of the rim portions independently of the bolts used in securing the rim portions to each other.

For the purpose of preventing accidental removal or disengagement of the rim portions 7 and 20 from each other when the securing means for the rim portions is relieved by unthreading the nuts 27 from the bolts 26 and the pneumatic tire is inflated, safety catch means is provided to limit the relative movement of the rim portions in a disengaging direction. The safety catch means is formed of the circumferentially spaced angularly movable or tiltable catch members 31 each of which is pivotally mounted at one end on the yoke 32 secured to the annular portion 18 as by being riveted thereto. Each catch member is resiliently swung by the spring 33 in a direction such that its free end normally extends through the hole 34 in the annular portion 18 and is held against the outboard boundary of the hole to occupy a position to be engaged by the outboard edge of the annular portion 25. Figure 4 illustrates the positions of the parts assumed after the rim portions have been spread apart under the influence of the inflated tire and while the nuts are being unthreaded from the bolts. The rim portions may be readily and safely disengaged from each other by first deflating the tire and then holding the catch members depressed out of operative position while unthreading the nuts from the bolts.

It will be noted that the parts of the wheel are so constructed that they may be formed of sheet metal, such as sheet steel, by simple operations. It will also be noted that the rim portions may be accurately formed so that their parts upon which the tire beads seat may be properly inclined to engage the beads. It will also be noted that the construction is such that the means for securing the rim portions to each other is relieved of both radial and driving thrusts. It will also be noted that accidental disengagement of the rim portions and consequent possibility of injury when the tire is inflated is prevented.

It will be further noted that the outboard rim portion is located completely at the inboard side of the outboard face of the bolting-on portion of the wheel body portion so that, if desired, another a wheel constructed in the same manner may be mounted on the wheel hub to provide a dual wheel construction.

The modification illustrated in Figure 5 is the same as that illustrated in Figures 1 to 4, inclusive, with the exception that the bolts 35 and nuts 36 threaded thereon for securing the outboard rim portion 37 to the inboard rim portion 38 are reversed, the nuts being at the outboard side of the generally radially extending portion 39 of the outboard rim portion. It will also be noted that this generally radially extending portion is formed with the bosses 40 for engagement by the nuts. With this construction, the outboard rim portion may be removed without the necessity of first removing the wheel from the hub.

Figures 6 and 7 illustrate another embodiment of the invention comprising inboard and outboard elements or sections 41 and 42, respectively. The inboard element or section comprises the integral annular rim portion 43 of the same general construction as the rim portion 7, and the integral wheel body portion 44, which latter is located within the confines of the rim portion 45 of the outboard element or section 42. This latter rim portion is formed in the same manner as the rim portion 19. As will be noted in Figure 7, the outboard rim portion is sleeved on and splined to the inboard rim portion in the same manner as illustrated in Figures 1 to 4, inclusive, to relieve the means for securing the outboard rim portion 45 to the inboard rim portion 43 from both radial and driving thrusts. It is apparent that the securing means may be reversed in the same manner as illustrated in Figure 5.

Figures 8, 9 and 10 illustrate another embodiment of the invention in which the inboard and outboard elements or sections 46 and 47, respectively, are formed in much the same manner as the inboard and outboard elements or sections 5 and 6 of Figures 1 to 4, inclusive. The inboard element or section comprises the integral annular rim portion 48 and wheel body portion 49, the latter being reinforced by the sheet metal member 50 welded thereto and also having radially outwardly beyond the reinforcement the ventilating holes 51. The rim portion 48 has an annular tire engaging portion formed in the same manner as the tire engaging portion 14 and also has an annular attachment portion 52 which is formed of the generally radially extending portion 53 and the annular portion 54. The outboard element or section comprises an annular rim portion 55 having the annular tire engaging portion 56 formed in the same manner as the tire engaging portion 19 and the annular attachment portion 57 comprising the generally radially extending portion 58 and the annular portion 59. The annular portions 54 and 59 are concentric and slidably engage each other. Also they are splined to each other by bosses formed in the same manner as the bosses 29 and 30. As a result, the bolts 60, which with the nuts 61 detachably secure the rim portions to each other, are relieved from radial and driving stresses. The construction is such that the rim portions encircle the brake flange 62 of the brake drum, instead of being located partly at the outboard side thereof.

The safety catch means comprises the circumferentially spaced catch members 63. Each catch member is preferably formed of sheet metal and has the generally axially extending portion 64 which extends through aligned holes in the generally radially extending portions 53 and 58. Each catch member has at the inboard edge of the body portion the radially outwardly extending portion 65 located at the inboard side of the generally radially extending portion 53 and formed with the boss 66 for engagement by the frustoconical nose of the associated nut 61. Each catch member has at the outboard edge of the body portion the catch portion 67 which is inclined radially inwardly and in an inboard direction to correspond to the outboard edge of the annular portion 59. The construction is such that, as shown more particularly in Figure 10, the catch portion 67 is engaged by the outboard edge of the annular portion 59 when the nuts 61 are unthreaded from the bolts 60, especially when the tire is inflated so that further relative disengaging movement is prevented. However, when the tire is deflated and the nuts are unthreaded from the bolts, the catch members 63 may be angularly moved or tilted so that their catch portions 67 will clear the annular portions 59 upon continued unthreading of the nuts.

In the modification illustrated in Figures 11 and 12, the construction of wheel is the same as that illustrated in Figures 8, 9 and 10, with the exception that the bolts 68 and nuts 69 for detachably securing the elements or sections of the wheel together are reversed and the safety catch means comprising safety catch members 70 are also reversed so that their radially outwardly extending portions 71 are engaged by the nuts 69 and their catch portions 72 are engageable with the inboard element or section when the securing means is released, the position of the parts at this time being shown in Figure 12.

Figures 13, 14, 15 and 16 illustrate another embodiment of the invention in which the inboard and outboard elements or sections 73 and 74, respectively, form the wheel. The inboard element or section comprises the integral annular rim portion 75 and wheel body portion 76, the latter being reinforced by the sheet metal member 77 welded thereto. The rim portion 75 has an annular tire engaging portion comprising the base 78 and the integral tire retaining flange 79. The rim portion also has an annular attachment portion which is formed of the generally radially extending portion 80 at the outboard edge of the base and the annular portion 81 at the radially inner edge of the portion 80 and connecting integrally into the wheel body portion 76. The outboard element or section comprises an annular rim portion 82 which is formed of the two annular members 83 and 84 fixedly secured together. The member 83 has the axially extending annular portion 85 and the generally radially inwardly extending portion 86. The member 84 has the tire retaining flange 87, the generally radially inwardly extending portion 88, and the annular portion 89 at the radially inner edge of the portion 88. The annular portion 89 is concentric with and slidably engages the annular portion 81. These two annular portions are also splined to each other preferably by radially outwardly bossing the annular portions, as shown particularly in Figure 15, it being noted that the reinforcement 77 is not bossed. The two members 83 and 84 together form the annular tire engaging portion and the annular attachment portion, the axially extending annular portion 85 being sleeved over the outboard end portion of the base 78. The outboard end portion is preferably of less diameter than the remainder of the base so that the radially outer face of the annular portion 85 is substantially flush with the adjacent radially outer face of the base.

The elements or sections are detachably secured together by the bolts 92 and nuts 93 threaded thereon and the elements or sections are prevented from becoming disengaged upon releasing of the securing means when the pneumatic tire is inflated by the catch members 94. The construction of the bolts, nuts and catch members is essentially the same as that illustrated in Figures 8, 9 and 10.

The modification illustrated in Figures 17, 18 and 19 comprises the inboard and outboard elements or sections 95 and 96, respectively. The inboard element or section comprises the integral annular rim portion 97 and wheel body portion 98 and the outboard element or section comprises the rim portion 99. The rim portions 97 and 99, in addition to their tire engaging portions, have attachment portions comprising generally radially extending portions 100 and 101, respectively, and generally axially extending annular portions 102 and 103, respectively, at the radially inner edges of the portions 100 and 101 and slidably engaging each other. Securing bolts 104 extend through the portions 100 and 101, the latter being bossed, and cooperate with the securing nuts 105 at the outboard side of the portion 101 to detachably secure the elements or sections together. The annular portions are splined to each other by the series of angularly spaced radially outwardly depressed bosses 106 and 107 slidably engaging each other.

Safety catch means formed of the angularly spaced catch members 108 prevent accidental removal or disengagement of the rim portions 97 and 99 from each other when the securing nuts are unthreaded from the securing bolts with the tire inflated. The catch members 108 are constructed and mounted in the same general manner as the catch members 31, the catch members 108 being located preferably midway of and corresponding in number to the bosses 106 and 107. The lengths of the bosses 106 and 107 and the position of the catch members 108 provides upon release of the securing nuts 105 from their bolts 104 for complete disengagement of the bosses 107 from the bosses 106. The lengths of the bolts 104 are such that the portion 101 clears the bolts at this time. The endwise clearance between the bosses permits rotation of the outboard element or section 96 relative to the inboard element or section 95 to register the bosses 107 with the catch members 108. After the registration has been effected the outboard element or section 96 may be axially moved over the catch members 108 without the necessity of tilting the latter.

To reassemble the parts, the outboard element or section may be readily moved axially into place with the driving bosses in registration and the bolts and their holes also in registration, the catch members during this time being angularly depressed.

Figure 20 illustrates another embodiment of the invention in which the parts have the same arrangement as illustrated in Figures 17, 18 and 19, with the exception that the safety catch means comprises the angularly spaced safety catch members 109 which are fixedly secured to the inboard element or section 110. In this modification the lengths of the securing bolts and driving bosses and the position of the stationary catch members provide for the same method of completely removing the outboard element or section 111 from the inboard element or section 110, as shown in Figures 17, 18 and 19. However, in assembling these elements or sections, the outboard element or section after being passed over the stationary catch members must be rotated to register the driving bosses with each other and also the securing bolts with their receiving holes.

What I claim as my invention is:

1. In a wheel, an element having an annular tire engaging portion, an attachment portion, and a wheel body portion, a second element having an annular tire engaging portion and an attachment portion and cooperating with said first mentioned element to form a tire carrying rim, means engaging said attachment portions for securing said elements together, and safety catch means spaced from said second element when the latter is secured in operative relation to said first mentioned element and positioned to engage said second element and limit movement thereof from said first mentioned element upon release of said securing means, said safety catch means being tiltable to a position to clear said second element thereby allowing complete separation of said elements upon release of said securing means.

2. In a wheel, elements detachably secured together and having annular tire carrying rim portions, manually operable means for detachably securing said elements to each other, and safety catch means comprising a tiltable member spaced from one of said elements when secured in operative relation to the other of said elements and engageable with one of said elements upon relative movement of said elements under the pressure exerted by the tire when said securing means is released, said member being manually tiltable to a position to clear said one of said elements engageable with said member thereby allowing complete separation of said elements when said securing means is released.

3. In a wheel, elements detachably secured together and having annular inboard and outboard tire carrying rim portions, manually operable means for detachably securing said elements to each other and safety catch means comprising a catch member having a generally radial portion at and engageable with the inboard side of said inboard rim portion and a generally radial portion at and engageable with the outboard side of said outboard rim portion, said catch member being angularly movable through a generally radial path to clear one of said rim portions.

4. In a wheel, elements detachably secured together and having annular tire carrying rim portions, manually operable means for detachably securing said elements to each other, and safety catch means comprising a catch member movable in a generally radial path, said catch member being spaced from one of said elements when secured in operative relation to the other of said elements and being engageable with one of said elements upon relative movement of said elements under the pressure exerted by the tire when said securing means is released, said catch member being manually movable in a generally radial path to a position to clear said one of said elements engageable with said catch member thereby allowing complete separation of said elements when said securing means is released.

5. In a wheel, an element having an annular tire engaging portion, an attachment portion and a wheel body portion, said wheel body portion having an opening therethrough, a second element having an annular tire engaging portion and an attachment portion and cooperating with said first mentioned element to form a tire carrying rim, manually operable means engaging said attachment portions for detachably securing said elements to each other, and safety catch means comprising a catch member mounted on said first mentioned element and extending through the opening in said wheel body portion and engageable with said second mentioned element upon relative movement of said elements under the pressure exerted by the tire when said securing means is released, said catch member being manually movable in a generally radial path to clear said second mentioned element thereby allowing complete separation of said elements when said securing means is released, and spring means for normally holding said catch member in position to engage said second mentioned element when said securing means is released.

CHARLES W. SINCLAIR.